Figure 1:
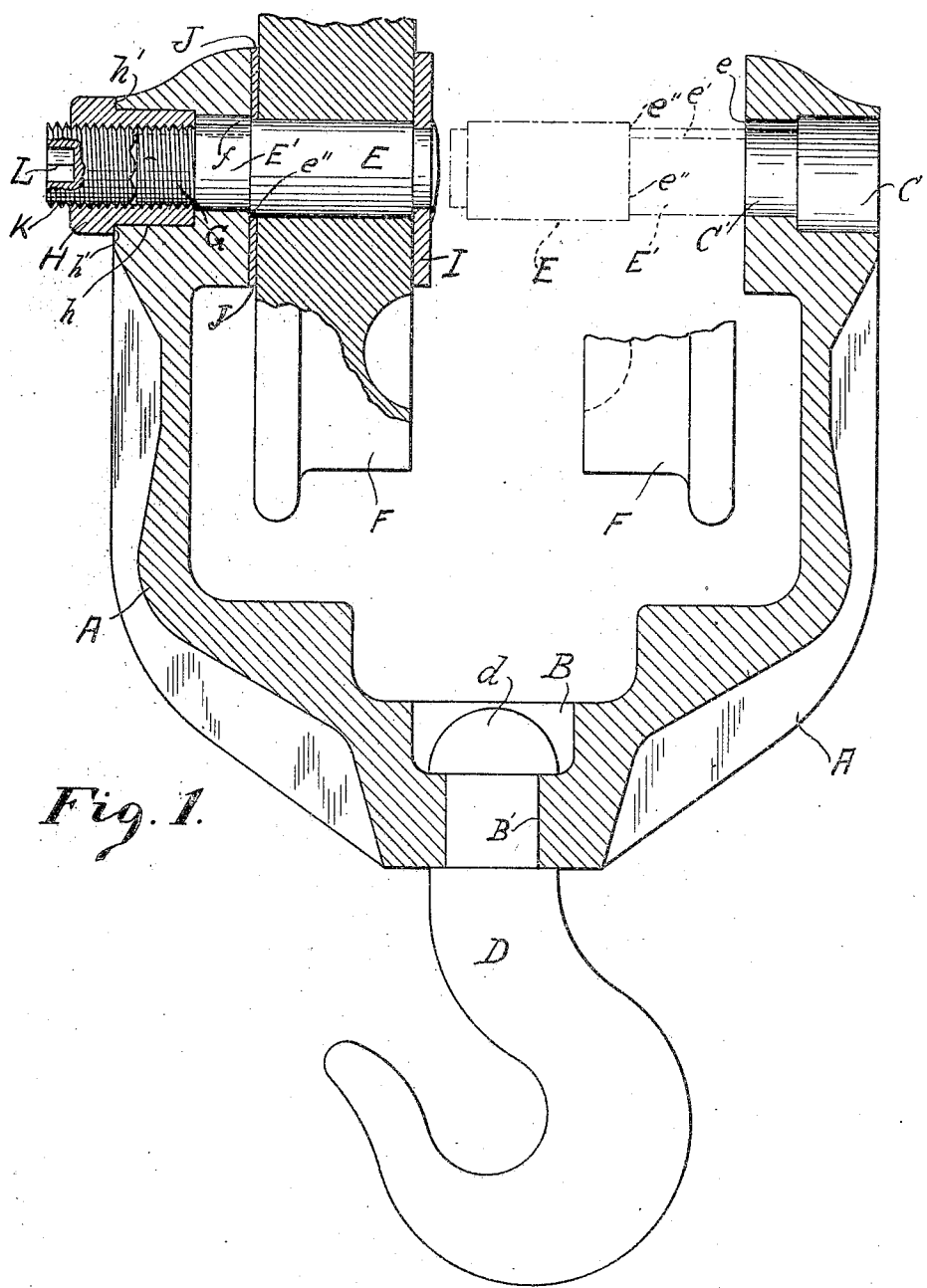

Patented Feb. 20, 1923.

1,445,893

UNITED STATES PATENT OFFICE.

NIC KRUMP, OF CHICAGO, ILLINOIS.

TROLLEY FOR SUSPENDED TWO-RAIL TRACKS.

Application filed June 20, 1922. Serial No. 569,657.

*To all whom it may concern:*

Be it known that I, NIC KRUMP, a citizen of the United States, and a resident of Chicago, in the county of Cook and State of Illinois, have invented certain new and useful Improvements in Trolleys for Suspended Two-Rail Tracks, of which the following, when taken in connection with the drawing accompanying and forming a part hereof, is a specification.

This invention relates to trolleys which are adapted to travel on two rail suspended tracks, and arranged to carry loads suspended thereon.

Among the objects of this invention are to obtain a trolley which is not liable to get out of order when subjected to long and hard usage, which is economically constructed, which does not require any considerable machine work before assembling and which is easily assembled, and which is durable.

In the drawing referred to Fig. 1 is a vertical sectional view of a trolley embodying the invention.

A represents a U-shaped yoke, which is provided with aperture BB', of two diameters, in the horizontal member thereof, and with duplicate apertures CC', which are also of two diameters, in the respective vertical members of the yoke. D represents a hook, the shank of which loosely fits part B' of aperture BB', and which is represented as headed over, at the upper end thereof, into part B of said aperture, so that said shank cannot be removed from the yoke by a load on said hook. EE', represents shafts or axles. F, F, represent flanged wheels which are rotatably mounted on part E of shafts or axles EE'. Part E' of said axles or shafts fits closely in part C' of apertures CC', and is provided with key way e'. The part C' of aperture CC' is provided with a key way e, which corresponds and registers with key way e', and f represents a pin which forms a key fitting in key ways e, e', to prevent rotation of the axle or shaft EE' when said shaft or axle is inserted in aperture CC', in the assembling of the several parts forming the trolley, as is illustrated at the upper end of the left hand vertical member of yoke A, as viewed in Fig. 1. G represents screw threads on the end of part E' of the shaft or axle EE', and H a nut having internal screw threads corresponding with and fitting on screw threads G. Part h of nut H is cylindrical, and is substantially of the same diameter as part C of aperture CC', and fits tightly therein. h' represents a shoulder which is formed at the junction of cylindrical part h of nut H and the hexagonal part thereof. Shoulder h' abuts against the outside of yoke A adjacent to the aperture CC' when the several parts of the trolley are assembled. I represents a washer which is rigidly secured on the end of part E of shaft or axle EE', as by riveting the end of the shaft or axle thereover, and J represents a washer which is loosely mounted on said shaft or axle between the hub of wheel F and the upper end of the yoke A. K represents a lock bolt, of substantially the same diameter as the screw threaded portion of part E' of shaft or axle EE', and L represents a recess in the outer end of bolt K.

In assembling the trolley a wheel F is loosely mounted on part E of a shaft or axle EE', and part E' of said shaft or axle, with key f in the key way e' thereof, is inserted in aperture CC'. The nut H is then turned on the screw threaded portion of part E' of said shaft or axle, to bring shoulder e'' against the part of the upper end of the vertical member of yoke A which is adjacent to the aperture therethrough. At this time the shoulder h' is forced against the yoke A, as is illustrated at the left hand side of Fig. 1 as viewed. The lock bolt K is then inserted in nut H and turned firmly against the end of part E' of shaft or axle EE', by means of a key inserted in recess L, to serve as a lock bolt preventing nut H from becoming loose in the operation of the trolley.

The broken lines indicating a shaft or axle EE', on the right hand side of Fig. 1, as viewed, illustrates the relative position of the shafts of the trolley when one thereof has been secured in position, as above recited and the remaining one, with a wheel thereon, is about to be inserted in the remaining aperture at the upper end of the remaining vertical member of the yoke.

The manner of inserting and securing in place the second shaft or axle, with a flanged wheel rotatably mounted thereon is similar to the way in which the first one of said shafts or axles is put in place, as recited.

I claim:

1. As a new article of manufacture, a trolley for a suspended two rail track, comprising a U-shaped yoke provided with means to attach a load thereto and provided with apertures of two diameters adjacent to the upper ends of the vertical members thereof, in combination with shafts of two diameters, the parts thereof of smaller diameters fitting the parts of said apertures of smaller diameters, flanged wheels rotatably mounted on said shafts, the parts of said shafts and of said apertures of smaller diameters provided with key ways, keys in said key ways, and means to secure said shafts rigidly in place in said apertures.

2. As a new article of manufacture, a trolley for a suspended two rail track, comprising a U-shaped yoke provided with means to attach a load to the horizontal member and provided with apertures of two diameters adjacent to the upper ends of the vertical members thereof, in combination with shafts of two diameters, the parts thereof of smaller diameters fitting the parts of said apertures of smaller diameters, flanged wheels rotatably mounted on the parts of said shafts of larger diameters, the parts of said shafts and of said apertures of smaller diameters respectively provided with key ways, keys in said key ways, the parts of said shafts of smaller diameters provided with screw threads, nuts fitting said screw threads, said nuts cylindrical for a portion of the outside thereof, and a lock bolt provided with screw threads fitting the screw threads in said nut, and arranged to be turned to abut the end thereof against the end of said shafts, respectively.

NIC KRUMP.

Witnesses:
 CHARLES TURNER BROWN.
 THOS. J. KELLEHER.